United States Patent
Fukuta et al.

(10) Patent No.: US 8,446,116 B2
(45) Date of Patent: May 21, 2013

(54) DISCHARGE CONTROL DEVICE FOR POWER CONVERSION SYSTEM

(75) Inventors: Junichi Fukuta, Anjo (JP); Tsuneo Maebara, Nagoya (JP); Yusuke Shindo, Nagoya (JP)

(73) Assignee: Denso Corporation, Kariya (JP)

( * ) Notice: Subject to any disclaimer, the term of this patent is extended or adjusted under 35 U.S.C. 154(b) by 301 days.

(21) Appl. No.: 13/044,041

(22) Filed: Mar. 9, 2011

(65) Prior Publication Data
US 2011/0221370 A1    Sep. 15, 2011

(30) Foreign Application Priority Data
Mar. 11, 2010 (JP) ................................. 2010-054414

(51) Int. Cl.
*H02P 6/14* (2006.01)
*H02P 6/08* (2006.01)

(52) U.S. Cl.
CPC .................................... *H02P 6/085* (2013.01)
USPC ...... 318/400.27; 318/494; 318/440; 318/248; 318/123

(58) Field of Classification Search
CPC .................................................... H02P 6/085
USPC .................... 318/400.27, 494, 440, 248, 123
See application file for complete search history.

(56) References Cited

U.S. PATENT DOCUMENTS
7,057,361 B2 *  6/2006  Kitahata et al. ............... 318/139
2004/0008530 A1   1/2004  Kitahata et al.

FOREIGN PATENT DOCUMENTS
| JP | 06-319263 | 11/1994 |
| JP | 09-201065 | 7/1997 |
| JP | 10-127062 | 5/1998 |
| JP | 11-308704 | 11/1999 |
| JP | 2004-015892 | 1/2004 |
| JP | 2009-232620 | 10/2009 |

OTHER PUBLICATIONS

U.S. Appl. No. 12/899,777 of Fukuta et al., filed Oct. 7, 2010.

* cited by examiner

*Primary Examiner* — Walter Benson
*Assistant Examiner* — David Luo
(74) *Attorney, Agent, or Firm* — Nixon & Vanderhye PC (57) ABSTRACT

The discharge control device for a power conversion system performs discharge control to discharge a capacitor parallel-connected to the input side of the power conversion system including a plurality of pairs of high-side and low-side switching elements connected in series and each controlled by a drive unit, by turning on the high-side and low-side switching elements of one of the pairs at the same time. At this time, the discharge control device inhibits an ON command from being inputted to the drive units for the high-side and low side switching elements of the other pairs.

8 Claims, 11 Drawing Sheets

FIG.6A
DRIVE MODE

FIG.6B
STANDBY MODE

DISCHARGE CONTROL DEVICE FOR POWER CONVERSION SYSTEM

This application claims priority to Japanese Patent Application No. 2010-54414 filed on Mar. 11, 2010, the entire contents of which are hereby incorporated by reference.

BACKGROUND OF THE INVENTION

1. Field of the Invention

The present invention relates to a discharge control device for a power conversion system.

2. Description of Related Art

There is known a discharge control device for a power conversion system, which is configured to make a short circuit between the positive and negative electrodes of a capacitor connected across the input terminals of an inverter connected to a DC power source at these input terminals, the inverter including a plurality of pairs of a high-side switching element and a low-side switching element connected in series, by turning on the high-side and low-side switching elements of one of the pairs at the same time, to thereby discharge the capacitor for the sake of safety, for example, when an abnormal state occurs. For example, refer to Japanese Patent Application laid-open No. 2009-232620. This discharge control device has a structure in which the gate voltage of each of IGBTs used as the switching elements is reduced when the electrodes of the capacitor are short-circuited compared to when the control apparatus operates in the normal state, in order to prevent the discharge current of the capacitor from becoming excessively large.

Generally, manipulation signals of such an inverter are complementary signals used as on/off commands generated through a PWM process performed based on the results of comparison between a command value received from the outside and a carrier common to the high-side and the low-side switching elements. In more detail, the manipulation signal for the high-side switching element is turned on to make an on command while the command value is larger than the carrier, and the manipulation signal for the low-side switching element is turned off to make an off command while the command value is larger than the carrier. However, the above conventional discharge control device has a problem in that, when the high-side and low-side switching elements corresponding to the U-phase of an electric rotating machine powered by the inverter, for example, are turned on at the same time to discharge the capacitor, there may occur a case in which the high-side switching element or the low-side switching element corresponding to the V-phase or the W-phase is applied with the high voltage of the DC power source. In this case, since the gate voltage of the switching elements used to discharge the capacitor is lower than that of the switching elements not used to discharge the capacitor, a current may flow through the switching elements not used to discharge the capacitor, causing the electric rotating machine to rotate.

SUMMARY OF THE INVENTION

An embodiment provides a discharge control device for a power conversion system, the power conversion system including:

a DC/AC conversion circuit including a plurality of pairs of a high-side switching element and a low-side switching element connected in series, connection nodes of the pairs being connected to corresponding phases of an electric rotating machine, the high-side and low-side switching elements of each of the pairs being on/off-controlled in accordance with manipulation signals received from outside the discharge control device to make and break an electrical connection between one of positive and negative electrodes of a capacitor and a corresponding one of the phases of the electric rotating machine, the high side and low-side switching elements being voltage-controlled switching elements each including a conduction control terminal; and a switch section which is turned and off to make and break an electrical connection between a DC power source and a parallel connection of the DC/AC conversion circuit and the capacitor, the discharge control device comprising:

a discharge control section that performs a discharge control on condition that the switch section is off in order to reduce a charge voltage of the capacitor by turning on the high-side and low-side switching elements of a predetermined one of the pairs at the same time to make a short circuit between the positive and negative electrodes of the capacitor; and a restraining section that manipulates voltages respectively applied to the conduction control terminals of the high-side and low-side switching elements of the other pairs other than the predetermined pair in order to prevent a current flowing to the electric rotating machine through the other pairs while the discharge control is performed.

According to the present invention, there is provided a discharge control device for a power conversion system including a DC/AC conversion circuit parallel-connected with a capacitor at its input, capable of discharging the capacitor while preventing the discharge current from becoming excessive and preventing an electric rotating machine driven by the power conversion system to rotate when the capacitor is discharged.

Other advantages and features of the invention will become apparent from the following description including the drawings and claims.

PREFERRED EMBODIMENTS OF THE INVENTION

First Embodiment

Figure 1:
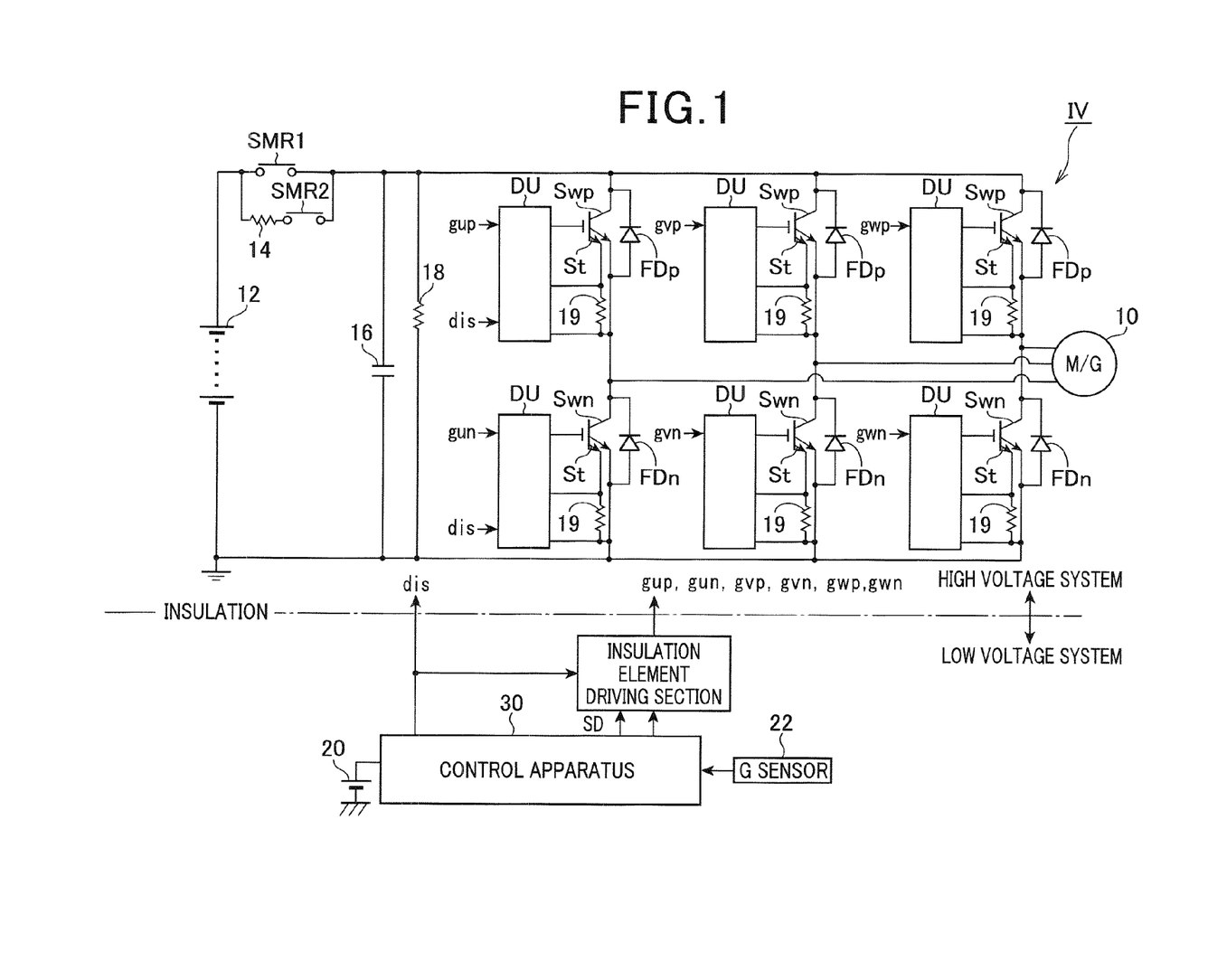
FIG. 1 is diagram showing the structure of a power conversion system including an inverter and a control apparatus according to a first embodiment of the invention.

FIG. 1 is a diagram showing the structure of a power conversion system for use in a hybrid vehicle, the system including an inverter IV and a control apparatus 30 according to a first embodiment of the invention. In FIG. 1, the reference numeral 10 denotes motor/generator which operates as a main engine of the hybrid vehicle. The motor/generator 10 is mechanically coupled to drive wheels of the hybrid vehicle. The motor/generator 10 is connected to a high-voltage battery 12 through the inverter IV, and a parallel connection of a relay SMR1 and a relay SM2 connected with a resistor 14. The terminal voltage of the high-voltage 12 is as high as above 100 V. A capacitor 16 and a discharge resistor 18 are parallel connected across the input terminals of the inverter IV (or the output terminals of the parallel connection of the relay SMR1 and the relay SM2 connected with the resistor 14).

The inverter IV is constituted of three pairs of a high-side switching element Swp and a low-side switching element Swn connected in series corresponding to U-phase, V-phase and W-phase of the motor/generator 10. The connection nodes of the respective pairs are connected to the corresponding phases of the motor/generator 10, respectively.

A high-side freewheel diode FDp is connected between the input and output terminals (the collector and emitter) of each of the high-side switching elements Swp at the cathode and anode thereof. A low-side freewheel diode FDn is connected between the input and output terminals (the collector and the emitter) of each of the low-side switching elements Swn at the cathode and anode thereof. Each of the switching elements Swp and Swn is constituted of an IGBT (Insulated Gate Bipolar Transistor). Further, each of the switching elements Swp and Swn is provided with a sense terminal St which outputs a small current whose value depends on a current flowing between the input and output terminals of the switching element.

The small current outputted from the sense terminal St flows to a shunt resistor 19, causing a voltage drop across the shunt resistor 10. This voltage drop is inputted to the drive unit Du in order to drive the switching element Sw# (#=p, n). The drive unit DU forcibly turns off the switching element Sw# upon determining that the current flowing between the input and output terminals of the switching element Sw# exceeds a predetermined threshold Ith based on the voltage drop across the shunt resistor 19.

The control apparatus 30 is an electronic control apparatus powered by a low-voltage battery 20. The control apparatus 30 manipulates the inverter IV in order to control a controlled variable of the motor/generator 10 as an object of control. To this end, the control apparatus 30 generates manipulation signals gup, gvp and gwp for the switching elements Swp corresponding to the U-phase, V-phase and W-phase of the inverter IV, and also generates manipulation signals gun, gvn and gwn for the switching elements Swn corresponding to the U-phase, V-phase and W-phase of the inverter IV. The switching element Swp and Swn are on/off-controlled by the control apparatus 30 through the drive units DU in accordance with the manipulation signals. The control apparatus 30 also detects collision of the vehicle with another vehicle, for example, based on the output signal of a G-sensor 22 which detects acceleration of the vehicle based on a force applied thereto. Upon detecting a collision, the control apparatus 30 outputs an abnormal-state discharge command dis to the drive unit DU for the switching elements SWp and Swn corresponding to the U-phase in order to forcibly discharge the capacitor 16.

In this embodiment, a high-voltage system including the inverter IV and a low-voltage system including the control apparatus 30 are electrically insulated from each other by a not shown insulation means such as photocouplers. The manipulation signals g*# (*=u, v, w, #=p, n) and the abnormal-state discharge command dis are transmitted from the low-voltage system to the high-voltage system through the insulation means. An insulation element driving section 60 shown in FIG. 1 is a circuit which drives insulation elements (photocouplers, for example) to transmit the manipulation signals g*# to the high-voltage system.

Figure 2A:
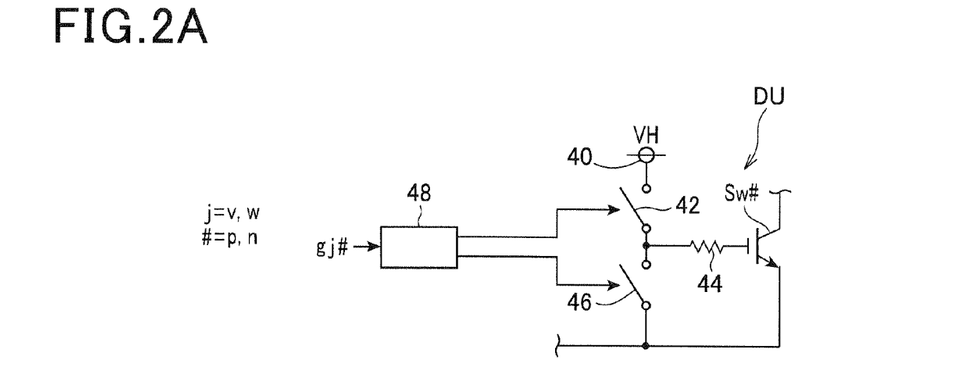
FIGS. 2A to 2C are circuit diagrams of drive units included in the power conversion system of the first embodiment.
Figure 2B:
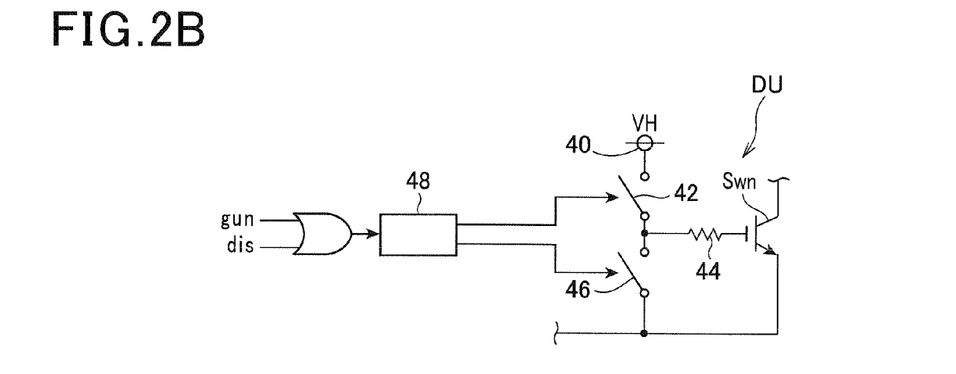
Figure 2C:
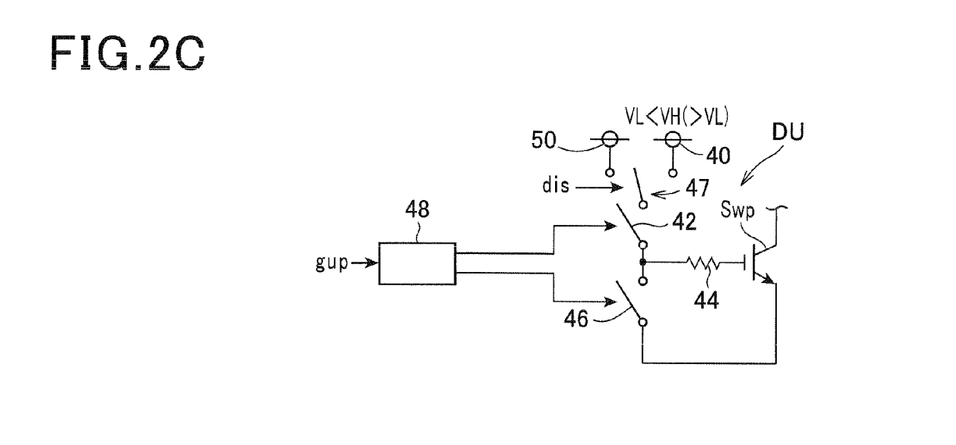

FIGS. 2A to 2C show the structures of drive circuit sections of the drive units DU for turning and off the switching element Sw#. More specifically, FIG. 2A shows the drive circuit section of the drive unit DU for the V-phase or W-phase, FIG. 2B shows drive circuit section of the drive unit DU for the lower arm (low-side switching element) corresponding to the U-phase, and FIG. 2C shows the drive circuit section of the drive unit DU for the upper arm (high-side switching element) corresponding to the U-phase.

As shown in FIG. 2A, the drive unit DU for the V-phase or W-phase includes a power source 40 whose terminal voltage is VH. The voltage generated by the power source 40 is applied to the conduction control terminal (gate) of the switching element Sw# through a charge switching element 42 and a gate resistor 44. The gate of the switching element Sw# is connected to the output terminal (emitter) thereof through the gate resistor 44 and a discharge switching element 46 to form a discharge path of the gate. The charge switching element 42 and the discharge switching element 46 are turned on and off by a drive control section 48 in accordance with the manipulation signals gj# (j=v, w). Accordingly, the switching element Sw# is turned on and off by the drive control section 48.

As shown in FIG. 2B, the drive unit DU for the lower arm corresponding to the U-phase is basically the same in structure as the drive unit DU shown in FIG. 2A except for that a logical sum signal of the manipulation signal gun and the abnormal-state discharge command dis outputted from an OR circuit 49 is inputted to the drive control section 48.

As shown in FIG. 2C, the drive unit DU for the upper arm corresponding to the U-phase is basically the same in structure as the drive unit DU shown in FIG. 2A except for that, in addition to the power source whose terminal voltage is VH, a power source 50 whose terminal voltage is VL lower than VH is provided connectable to the charge switching element 42. More specifically, one of the power source 40 and the power source 50 selected by a selector 47 in accordance with the abnormal-state discharge command dis is connected to the charge switching element 42. In more detail, the power source 40 is connected to the charge switching element 42 in the normal state where the abnormal-state discharge command dis is not issued, and the power source 50 is connected to the charge switching element 42 in an abnormal state where the abnormal-state discharge command dis is issued.

Figure 3:
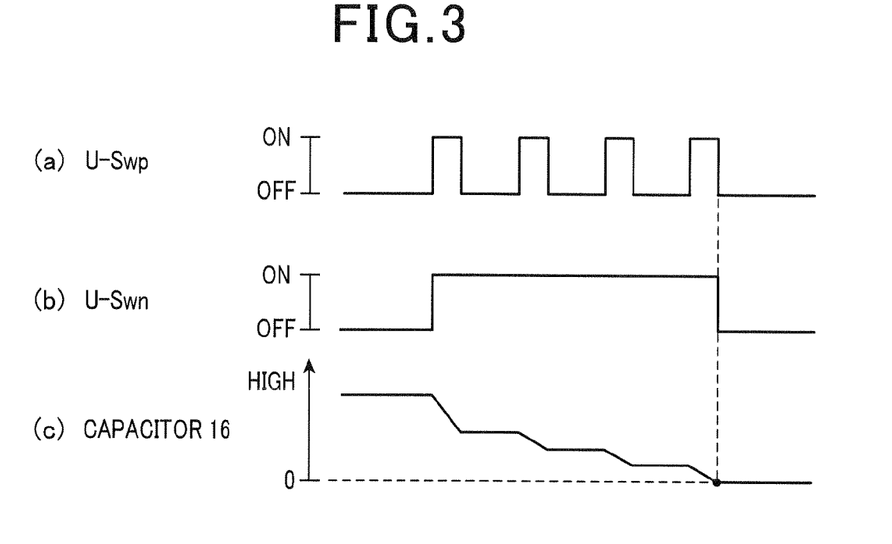
FIG. 3 is a time chart showing an operation of discharge control performed by the control apparatus according to the first embodiment when an abnormal state occurs.

Next, an operation of discharge control performed in response to the abnormal-state discharge command dis is explained with reference to the time chart of FIG. 3. The section (a) of FIG. 3 shows a state transition of the high-side switching element Swp corresponding to the U-phase, the section (b) of the FIG. 3 shows a state transition of the low-side switching element Swn corresponding to the U-phase, and the section (c) of FIG. 3 show a transition of the charged voltage of the capacitor 16. As shown in FIG. 3, in this embodiment, the high-side switching element Swp corresponding to the U-phase is turned on and off periodically with the low-side switching element Swn corresponding to the U-phase being kept on. As a result, the high-side and low-side switching elements Swp and Swn are turned on at the same time for certain periods of time during each of which both terminals of the capacitor 16 are short-circuited through these switching elements Swp and Swn.

Figure 4:
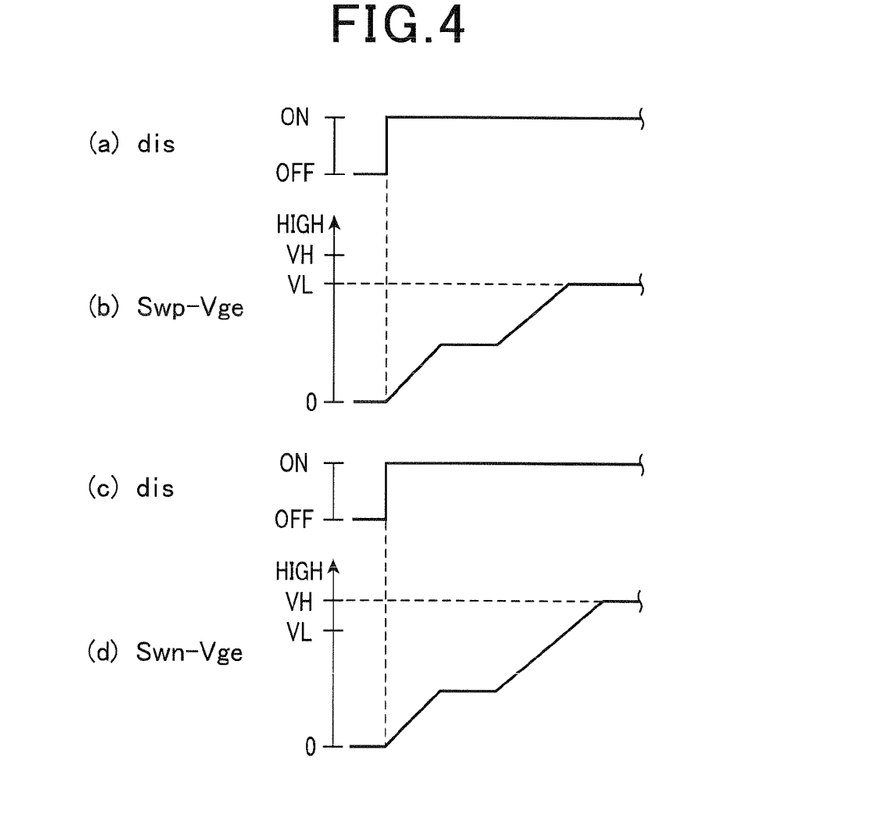
FIG. 4 is a time chart for explaining a method of gate voltage application in the first embodiment when an abnormal state occurs.

At this time, as shown in FIG. 4, the gate voltage of the high-side switching element Swp is lower than the gate voltage of the low-side switching element Swn because of the structures of the drive units DU explained with reference to FIG. 2. The section (a) of FIG. 4 shows a transition of the abnormal-state discharge command dis, and the section (b) of FIG. 4 shows a transition of the gate-emitter voltage Vge of the high-side switching element Swp. The section (c) of FIG. 4 shows a transition of the abnormal-state discharge command dis, and the section (d) of FIG. 4 shows a transition of the gate-emitter voltage Vge of the low-side switching element Swn.

According to the above described operation, the high-side switching element Swp is driven in the non-saturation region thereof, and the low-side switching element Swn is driven in the saturation region thereof. Accordingly, a current flowing through the high-side and low-side switching elements Swp and Swn is limited within the current in the non-saturation region of the high-side switching element Swp. Further, a current flowing through the high-side and low-side switching elements Swp and Swn is limited also because the high-side switching element Swp is turned on and off periodically, and accordingly the duration of each on-time is limited. It is preferable to set the current in the non-saturation region of the high-side switching element Swp to a value lower than the threshold current Ith specified by the drive unit DU. Incidentally, the terminal voltage VH is set such that the switching elements Swp and Swn are driven in their saturation regions when the control apparatus operates to control the controlled variable of the motor/generator 10.

The above described discharge control of the capacitor 16 is abnormal-state discharge control performed upon occurrence of an abnormal state such as a collision of the vehicle. However, in this embodiment, the capacitor 16 is also discharged by passing a reactive current to the motor/generator 10 when the vehicle makes a stop in the normal state, and accordingly the relay SMR is opened. This makes it possible to discharge the capacitor 16 more rapidly than discharging the capacitor 16 using the discharge resistor 18. Incidentally, the discharge resistor 18 is provided in preparation for an unexpected case, for example, where the vehicle is towed and the motor/generator 10 operates as a generator causing the capacitor 16 to be charged.

When the above explained abnormal-state discharge control is performed, a current may flow to the motor/generator 10 if the high-side switching element corresponding to the V-phase or W-phase not used for discharging the capacitor 16 is applied with a voltage. This may occur because the gate voltage of the high-side switching elements Swp corresponding to the V-phase and W-phase is the terminal voltage VH, which is higher than the terminal voltage VL applied to the gate of the high-side switching element Swp corresponding to the U-phase when the abnormal-state discharge control is performed. That is, since the voltage across the input and output terminals of the high-side switching element Swp corresponding to the U-phase drops more than the voltage across the input and output terminals of the high-side switching element Swp corresponding to the V-phase or W-phase, a current may flow to the motor/generator 10 through the high-side switching element Swp corresponding to the V-phase of W-phase.

Figure 5:
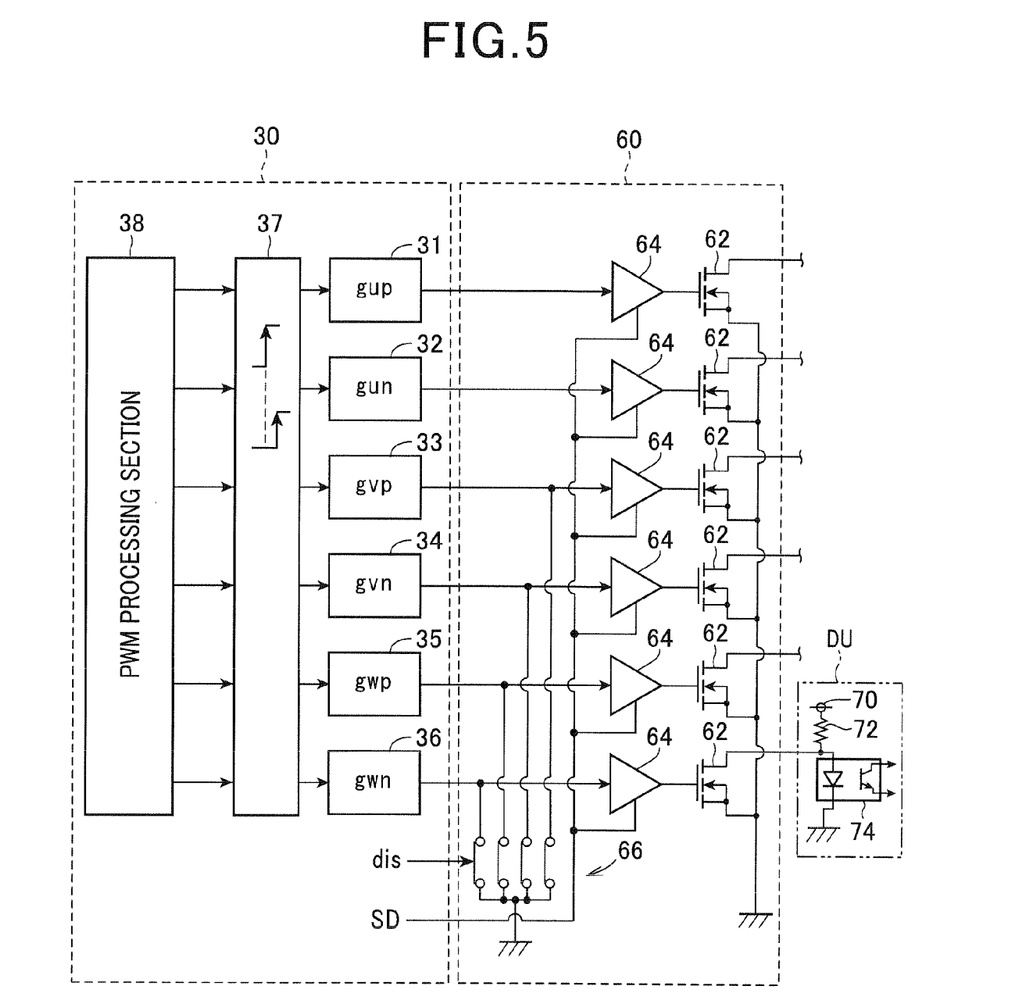
FIG. 5 is a diagram showing the structures of the control apparatus and an insulation element driving section included in the power conversion system of the first embodiment.

Accordingly, in this embodiment, the insulation element driving section 60 has a structure to eliminate such a situation. FIG. 5 shows part of the structure of the control apparatus 30 used to generate the manipulation signals g*#, and the structure of the insulation element driving section 60.

As shown in FIG. 5, the control apparatus 30 includes a PWM processing section 38. Signals generated by the PWM processing section 38 are dead-time corrected by a dead-time correcting section 37, and stored in registers 31 to 36 as the manipulation signals gup, gun, gvp, gvn, gwp and gwn, respectively. The manipulation signals stored in the resistors 31 to 36 are always outputted to the insulation element driving section 60.

The insulation element driving section 60 includes buffers 64 to respectively store the manipulation signals outputted from the registers 31 to 36, and switching elements 62 respectively applied with the output signals of the buffers 64. Each of the switching elements 62 is a switch for grounding the anode of a photodiode of a photocoupler 74 included in a corresponding one of the drive units DU. The anode of the photodiode is connected to a power supply line 70 through a resistor 72, and the cathode of the photodiode is grounded. Accordingly, when the switching element 62 is turned on, the photocoupler is turned off.

The buffers 64 are inputted with a shutdown signal SD. The shutdown signal SD is a signal for inhibiting ON commands for the switching elements Swp and Swn from being outputted to the drive units DU. The input terminals of the buffers 64 corresponding to the V-phase and W-phase are grounded through a shutdown switch 66. The shutdown switch 66 is closed when the abnormal-state discharge command dis is applied. Accordingly, when the abnormal-state discharge command dis is issued, the input terminals of the buffers 64 corresponding to the V-phase and W-phase are fixed to the L level (ground level) to inhibit the ON commands for the switching element Swp and Swn from being outputted to the drive units DU.

The above described configuration is provided in view of the fact that the control apparatus 30 cannot turn off the high-side and low-side switching elements Swp and Swn corresponding to the V-phase and W-phase at the same time when the abnormal-state discharge control is performed. The reason why is explained below with reference to FIGS. 6A, 6B and 7.

Figure 6A:
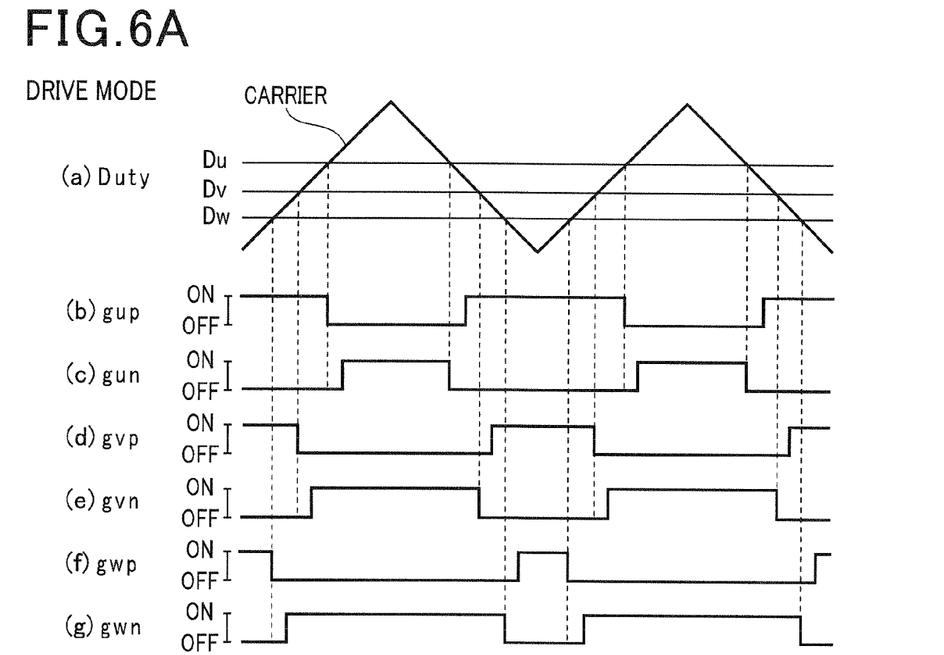
FIGS. 6A and 6B are time charts showing a process for generating manipulation signals to manipulate the inverter included in the power conversion system of the first embodiment 1.

FIG. 6A is a time chart explaining a method of generating the manipulation signals g*# by the control apparatus 30 in a drive mode to drive the motor/generator 10. In more detail, the section (a) of FIG. 6A shows transitions of duty ratio signals Du, Dv and Dw as manipulation variables for controlling the controlled variable of the motor/generator 10, and the sections (b) to (g) show transitions of the manipulation signals gup, gun, gvp, gvn, gwp and gwn, respectively.

As shown in FIG. 6A, the manipulation signals g*# are generated in accordance with the magnitude relationship between a carrier of a triangular wave and each of the duty ratio signals Du, Dv and Dw. The duty ratio signal Du is for generating the manipulation signals gup and gun for the U-phase, the duty ratio signal Dv is for generating the manipulation signals gvp and gvn for the V-phase, and the duty ratio signal Dw is for generating the manipulation signals gwp and gwn for the W-phase. Basically, when the carrier is larger than the duty ratio D*(*=u, v, w), the manipulation signal g*p makes the OFF command, and the manipulation signal g*n forms the ON command. On the other hand, when the carrier is smaller than the duty ratio D*, the manipulation signal g*p makes the ON command, and the manipulation signal g*n makes the OFF command. However, the timing of switch from the OFF command to the ON command is delayed by the dead-time correcting section 37 shown in FIG. 5.

Figure 6B:
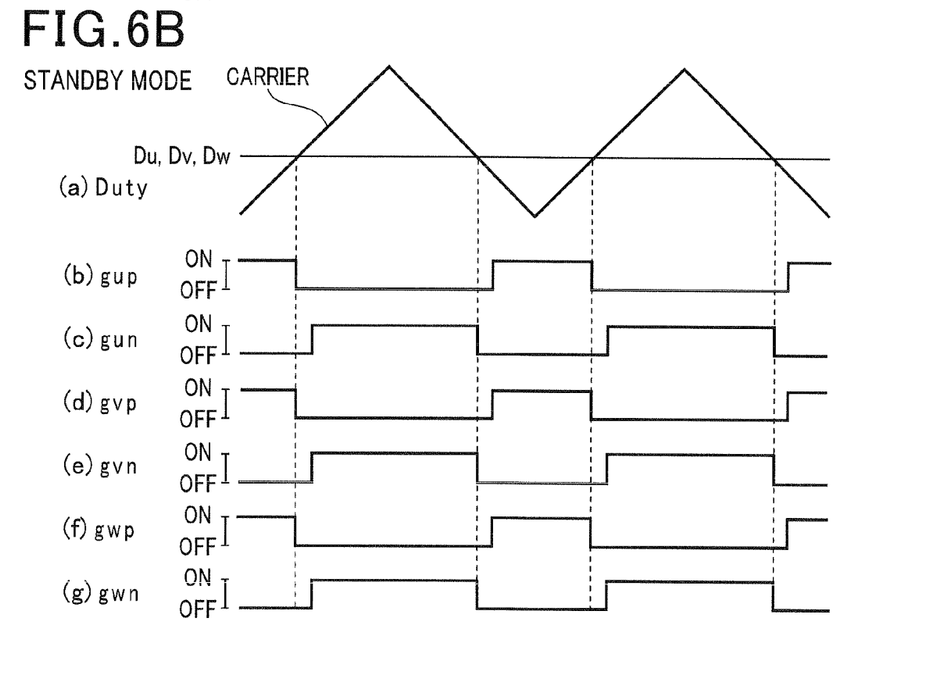

FIG. 6B is a time chart explaining the method of generating the manipulation signals g*# by the control apparatus 30 in a standby mode to drive the motor/generator 10 to wait for driving of the motor/generator 10. The standby mode is implemented by fixing the duty ratio signals Du, Dv and Dw to the same value. In the standby mode, the three terminals of the motor/generator 10 are short-circuited, and the phase voltages of the motor generator 10 are kept at 0.

However, it is not possible to turn off the high-side and low-side switching elements Swp and Swn corresponding to the V-phase and W-phase at the same time to whatever values the duty ratio signal Dv and Dw are set, depending on the process performed by the control apparatus 30. In addition, if the shutdown signal SD is generated to turn off the high-side and low-side switching elements Swp and Swn corresponding to the V-phase and W-phase at the same time, the abnormal-state discharge process cannot be performed because both the high-side and low-side switching elements are off.

The shutdown switch 66 shown in FIG. 5 is a hardware means provided in view of the above fact.

Figure 7:
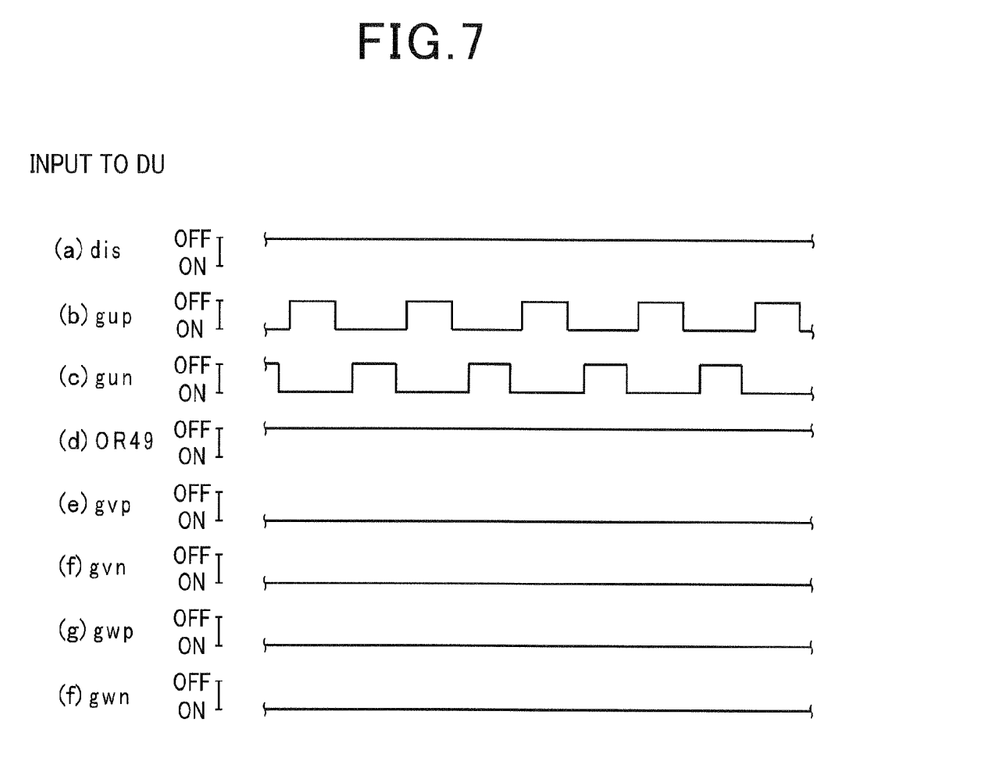
FIG. 7 is a time chart showing an operation of the discharge control performed by the control apparatus according to the first embodiment.
Figure 8:
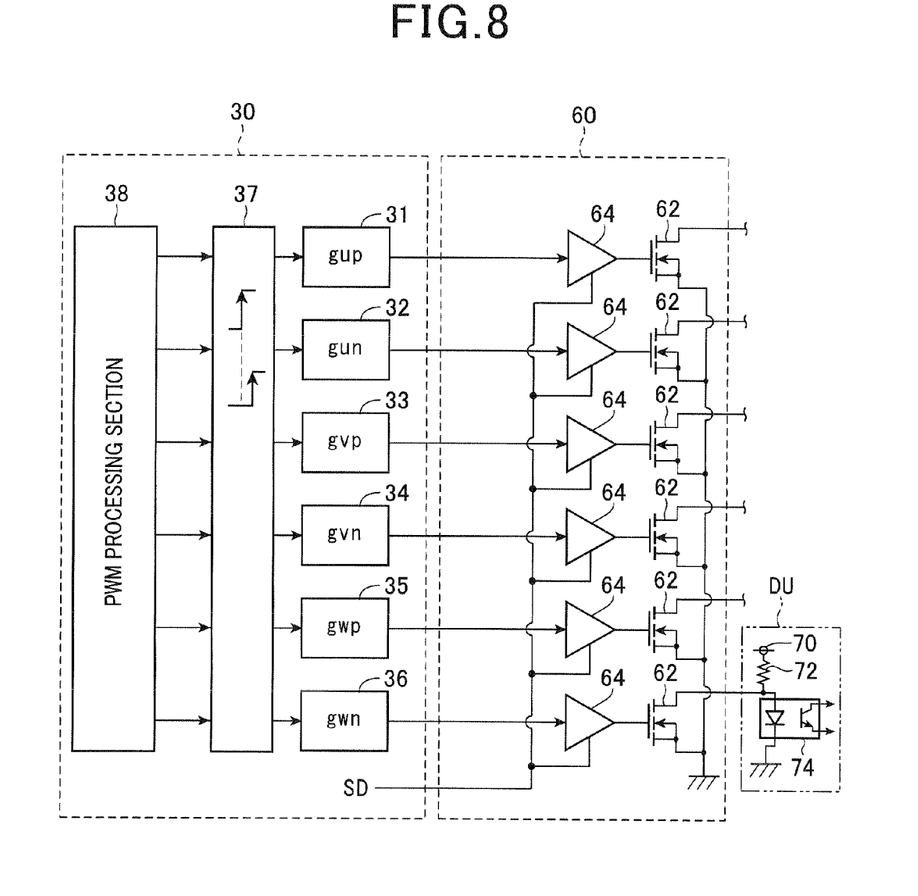
FIG. 8 is a diagram showing the structures of a control apparatus for a power conversion system according to a second embodiment of the invention, and an insulation element driving section included in the power conversion system of the second embodiment.

FIG. 7 is a time chart showing an operation of the abnormal-state discharge control performed in this embodiment. In more detail, the section (a) of FIG. 7 shows a transition of the abnormal-state discharge command dis, the section (b) of FIG. 7 shows a transition of the manipulation signal gup, the section (c) of FIG. 7 shows a transition of the manipulation signal gun, and the section (d) of FIG. 7 shows a transition of the output of the OR circuit 49. Further, the section (e) of FIG. 7 shows a transition of the manipulation signal gvp, the section (f) of FIG. 7 shows a transition of the manipulation signal gun, the section (g) of FIG. 7 shows a transition of the manipulation signal gwp, and the section (h) of FIG. 7 shows a transition of the manipulation signal gwn.

According to the first embodiment described above, the following advantages can be provided.

(1) The electrical state of the signal paths (the input terminals of the buffers 64) of the manipulation signals for the switching elements Swp and Swn corresponding to the V-phase and W-phase not used for performing the abnormal-state discharge control is manipulated so as to inhibit these switching elements Swp and Swn from being applied with the voltage to turn on them. This makes it possible to turn off the switching elements Swp and Swn corresponding to the V-phase and W-phase not used for performing the abnormal-state discharge control at the same time without changing the method of generating the manipulation signals gj# (j=v, w) by the control apparatus 30.

(2) The voltage applied to the gate of the high-side switching element Swp corresponding to the U-phase when the abnormal-state discharge control is performed is set lower than that when the inverter IV operates in the normal state. Since the operation of the abnormal-state discharge control causes the possibility that a current flows to the switching element Swp or Swn corresponding to the V-phase or W-phase through the motor generator 10, the provision of the shutdown switch 66 is technically significant.

(3) The abnormal-state discharge control is performed by periodically applying the low voltage (the terminal voltage VL) to the gate of the high-side switching element Swp, while applying the high voltage (the terminal voltage VH) to the gate of the low-side switching element Swn to keep this low-side switching element Swn in the on state. Accordingly, since the gate-emitter voltage of the switching element being turned on and off periodically can be made stable, the capacitor 16 can be discharged stably.

Second Embodiment

Next, a second embodiment of the invention is described with particular emphasis on the difference with the first embodiment.

The second embodiment differs from the first embodiment in that the shutdown switch 66 is removed from the insulation element driving section 60.

Figure 9:
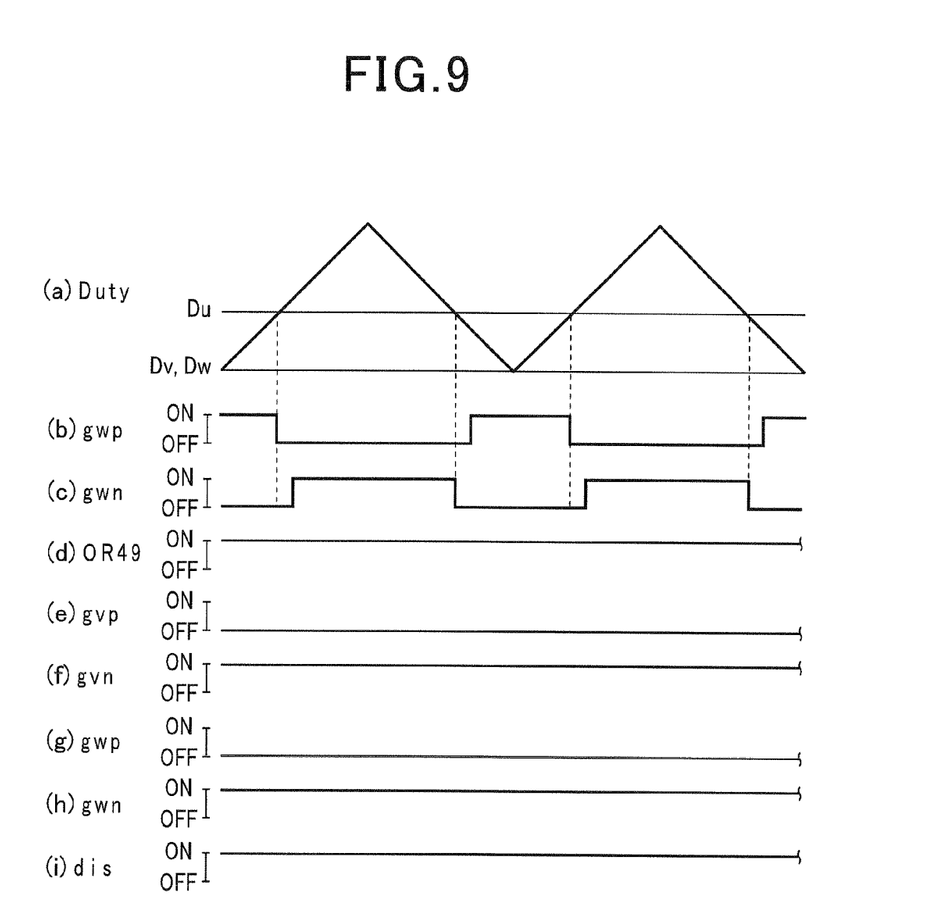
FIG. 9 is a time chart showing an operation of discharge control performed by the control apparatus according to the second embodiment.

FIG. 9 is a time chart shows an operation of the abnormal-state discharge control performed in the second embodiment. In more detail, the section (a) of FIG. 9 shows transitions of the duty signals Du, Dv and Dw, and the section (i) of FIG. 9 shows a transition of the abnormal-state discharge command dis. The sections (b) to (h) of FIG. 9 correspond to the sections (b) to (h) of FIG. 7, respectively.

Figure 10:
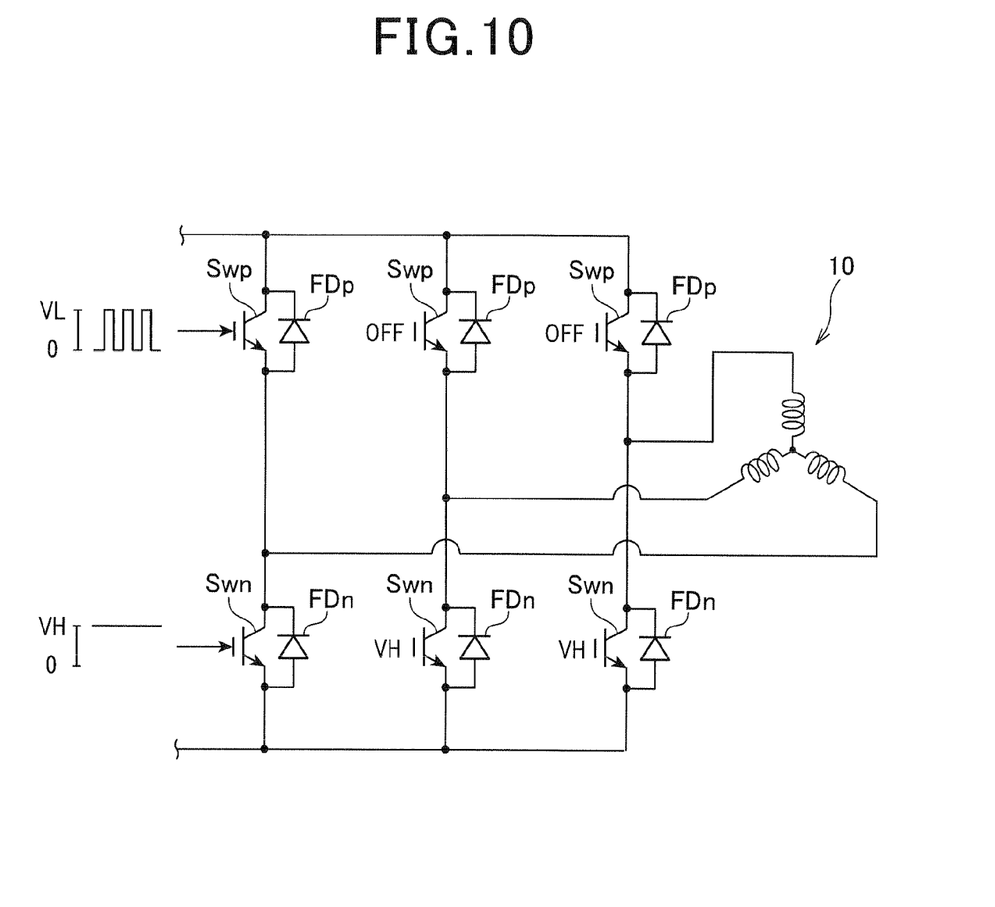
FIG. 10 is a diagram for explaining the principle of the discharge control performed in the second embodiment.

In this embodiment, the duty ratio signal Du is set between the peak and the valley of the carrier, and the duty ratio signals Dv and Dw are set to the valley of the carrier. Accordingly, as shown in FIG. 10, the high-side switching elements Swp corresponding to the V-phase and W-phase are kept in the off state, and the low-side switching elements Swn corresponding to the V-phase and W-phase are kept in the on state. In this case, since the gate voltage of the low-side switching element Swn is the same for the U-phase, V-phase and W-phase, the value of the voltage drop across the input and output terminals due to a current flowing through the low-side switching element Swn is the same for the U-phase, V-phase and W-phase. Accordingly, the current flowing to he high-side switching element Swn corresponding to the U-phase flows through the path including the low-side switching element Swn corresponding to the U-phase that has the lowest impedance of all the paths including the low-side switching elements Swn respectively corresponding to the U-phase, V-phase and W-phase. This is because, since a current has to pass through the motor/generator 10 to flow to the path including the low-side switching element Swn corresponding to the V-phase or W-phase, the path including the low-side switching element Swn corresponding to the V-phase or W-phase has also the impedance of the motor/generator 10.

The second embodiment provides the following advantage in addition to the foregoing advantages (2) and (3) provided by the first embodiment.

(4) The duty ratio signals Dv and Dw are manipulated so that the high-side switching elements Swp corresponding to the V-phase and W-phase are kept in the off state. This makes it possible that no current flows to the motor/generator 10 during the abnormal-stage discharge control by manipulating the operation parameter (the duty ratio signals) of the control apparatus 30.

Third Embodiment

Next, a third embodiment of the invention is described with particular emphasis on the difference with the second embodiment.

Figure 11A:
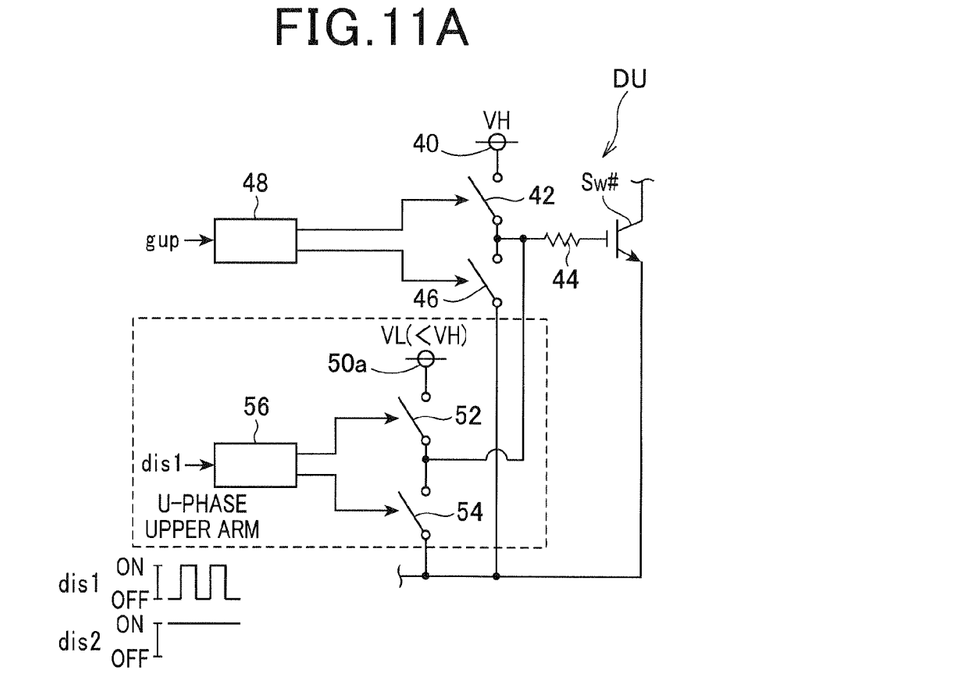
FIGS. 11A and 11B are circuit diagrams of a drive unit included in the power conversion system of the second embodiment.
Figure 11B:
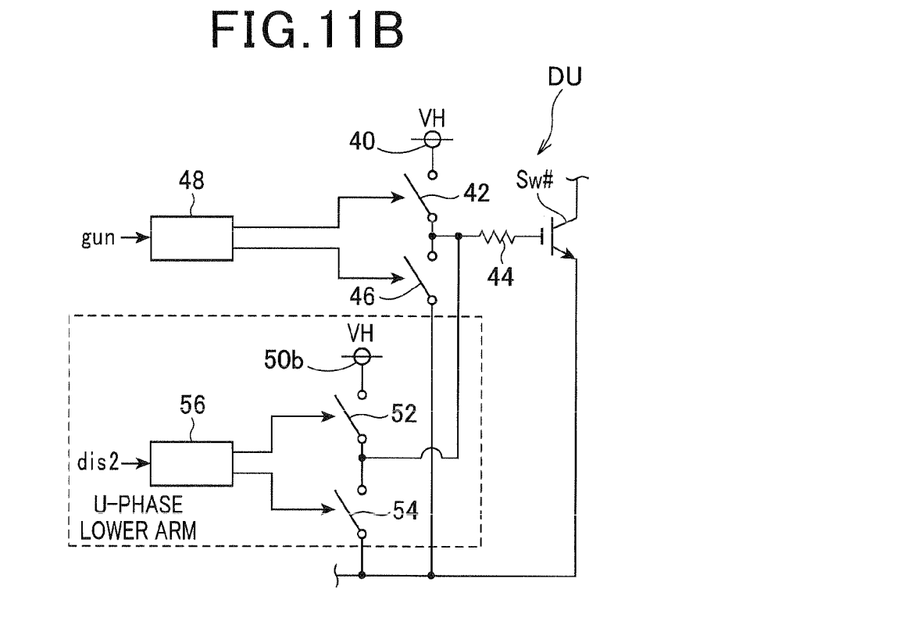

FIGS. 11A and 11B are diagrams showing the structures of the drive units DU for the U-phase used in the third embodiment. In FIGS. 11A and 11B, the same reference numerals or characters identical to those shown in FIG. 2 represent the same components.

The drive unit DU for the U-phase of the third embodiment is provided with an abnormality-state drive control section 56 dedicated to drive the switching elements Swp or Swn in accordance with a first abnormal-state discharge command dis1 or a second abnormal-state discharge command dis2.

More specifically, as shown in FIG. 11A, for the U-phase upper arm, the output voltage of a power source 50a whose output voltage is equal to the terminal voltage VL lower than the terminal voltage VH is applied to the gate of the high-side switching element Swp through a charge switching element 52 and the gate resistor 44. This gate is connected to the emitter of this high-side switching element Swp through the gate resistor 44 and a discharge switching element 54. The charge switching element 52 and the discharge switching element 54 are turned on and off by the abnormality-state drive control section 56 in accordance with the first abnormal-state discharge command dis1. Accordingly, the high-side switching element Swp is turned on and off in accordance with the first abnormal-state discharge command dis1.

As shown in FIG. 11B, for the U-phase lower arm, instead of the power source 50a, a power source 50b whose output voltage is equal to the terminal voltage VH is provided. The abnormality-state drive control section 56 is inputted with a second abnormal-state discharge command dis2 different from the first abnormal-state discharge command dis1.

Figure 12:
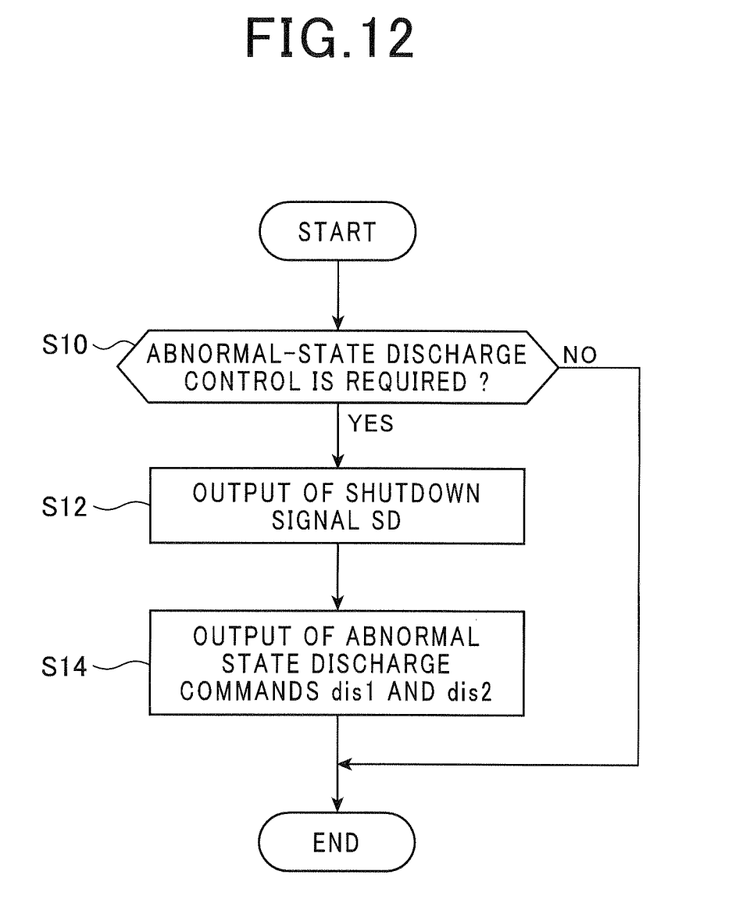
FIG. 12 is a flowchart showing a process of the discharge control performed in the second embodiment.

FIG. 12 is a flowchart showing the process of the abnormal-state discharge control performed in this embodiment. This process is performed repeatedly at regular time intervals by the control apparatus 30.

This process begins by determining whether or not a requirement of the abnormal-state discharge control has been made in step S10. In this embodiment, the requirement is made if a logical sum of two conditions is true, one condition being that the relay SMR1 is opened due to a collision of the vehicle, the other condition being that a condition to perform diagnosis for determining whether the abnormal-state discharge control can be performed is satisfied. Incidentally, it is possible to determine that a collision of the vehicle has occurred if the acceleration measured by the G sensor 22 exceeds a predetermined value. The condition to perform the diagnosis may include that the voltage of the capacitor 16 is higher than a predetermined voltage. The capacitor 16 may be charged intentionally to satisfy this condition for diagnostic purpose.

If the determination result in step S10 is affirmative, the process proceeds to step S12 to output the shutdown signal SD to the insulation element driving section 60. As a result, the ON command is inhibited from being inputted to the drive control section 48, and accordingly, the drive control section 48 is inhibited from turning on and off the switching elements Swp and Swn. In subsequent step S14, the abnormal-state discharge commands dis1 and dis2 are generated to control the switching elements Swp and Swn corresponding to the U-phase in the way shown in FIG. 3.

When step S14 is completed, or if the determination result in step S10 is negative, the process is terminated.

According to the third embodiment described above, other than the advantages (2) and (3) provided by the first embodiment, the following advantage can be provided.

(5) By the provision of the circuits dedicated to performing the abnormal-state discharge control (the charge switching element 52, discharge switching element 54, abnormal-state drive section 56, etc), the ON command is inhibited from being inputted to the drive control section 48 when the abnormal-state discharge control is performed. This makes it possible to perform the abnormal-state discharge control without changing the process of generating the manipulation signals g*# by the control apparatus 30.

Other Embodiments

The above embodiments may be modified as described below. Regarding the inhibition means:

The inhibition means is not limited to the one configured to interrupt input to the insulation element driving section 60 as shown in FIG. 5. For example, it may be configured to interrupt output from the insulation element driving section 60 to thereby inhibit the ON command from being generated. Further, it may be configured to interrupt input to the drive control section 48 in order to inhibit the ON command from being inputted to the drive control section 48.

Regarding the DC/AC Conversion Circuit:

The DC/AC conversion circuit (the inverter IV) whose high-side and low-side switching elements are turned on at the same time to discharge the capacitor 16 is not limited to the one that mediates power transmission between the electric rotating machine serving as a vehicle main engine, and the high-voltage battery 12. It may be the one that mediates power transmission between an electric rotating machine not serving as the vehicle main engine and the high-voltage vehicle battery 12.

Regarding the Discharge Control Means:

The abnormal-state discharge control means is not limited to the one configured to make a short circuit between both electrodes of the capacitor 16 multiple times by turning on and off the high-side switching element Swp multiple times while keeping the low-side switching element Swm in the on state. For example, it may be configured to make a short circuit between both electrodes of the capacitor 16 multiple times by turning on and off the low-side switching element Swn multiple times while keeping the high-side switching element Swp in the on state. However, also in this case, it is preferable that the voltage applied to the gate of the switching element turned on and off multiple times is set low so that this switching element operates in the non-saturation region. For another example, it may be the one configured to make a short circuit between both electrodes of the capacitor 16 multiple times by turning on and off the high-side and low-side switching elements Swp and Swn at the same time. Also in this case, it is preferable to set the gate voltages of the high-side and low-side switching elements Swp and Swn such that at least one of them operates in the non-saturation region. For still another example, it may be the one configured to make a short circuit between both electrodes of the capacitor 16 once during the period of discharging the capacitor 16.

Discharging the capacitor 16 is not necessarily performed using the pair of the high-side and low-side switching elements Swp and Swn corresponding to one of the phases of the motor/generator 10. For example, the capacitor 16 may be discharged by using the respective pairs of the high-side and low-side switching elements Swp and Swn in succession.

Further, the discharge control in which the high-side switching element Swp and the low-side switching element Swn are turned on at the same time may be performed not only when an abnormal state occurs, but also each time the relay SMR1 is opened in the normal state.

Other:

The high-side and low-side switching elements Swp and Swn are not necessarily IGBTs. They may be field effect transistors such as power MOSFETs.

The high-voltage battery 12 is not necessarily directly connected to the input terminals of the inverter IV. For example, the input terminals of the inverter IV may be connected to a step-up converter constituted of a reactor, a switching element connected to the capacitor 16 through the reactor, a freewheel diode connected to the switching element, and a capacitor connected to the series connection of the switching element and the freewheel diode. In this case, the capacitor connected to the output terminals of the step-up converter and the capacitor 16 are objects of the discharge control performed by the control apparatus 30. The voltage of the capacitor 16 decreases as the voltage of the capacitor of the step-up converter decreases when the discharge control is performed.

Although the above embodiments are directed to a hybrid vehicle, the present invention is also applicable to an electric vehicle whose main engine is constituted of only an electric rotating machine.

Also, the present invention is also applicable to a power conversion system for converting DC power of a residential power source into AC power. In this case, the abnormal state in which the capacitor 16 has to be discharged may be a state in which an earthquake is detected to occur.

The above explained preferred embodiments are exemplary of the invention of the present application which is described solely by the claims appended below. It should be understood that modifications of the preferred embodiments may be made as would occur to one of skill in the art.

What is claimed is:

1. A discharge control device for a power conversion system, the power conversion system including:
   a DC/AC conversion circuit including a plurality of pairs of a high-side switching element and a low-side switching element connected in series, connection nodes of the pairs being connected to corresponding phases of an electric rotating machine, the high-side and low-side switching elements of each of the pairs being on/off-controlled in accordance with manipulation signals received from outside the discharge control device to make and break an electrical connection between one of positive and negative electrodes of a capacitor and a corresponding one of the phases of the electric rotating machine, the high side and low-side switching elements being voltage-controlled switching elements each including a conduction control terminal; and
   a switch section which is turned and off to make and break an electrical connection between a DC power source and a parallel connection of the DC/AC conversion circuit and the capacitor,
   the discharge control device comprising:
   a discharge control section that performs a discharge control on condition that the switch section is off in order to reduce a charge voltage of the capacitor by turning on the high-side and low-side switching elements of a predetermined one of the pairs at the same time to make a short circuit between the positive and negative electrodes of the capacitor; and
   a restraining section that manipulates voltages respectively applied to the conduction control terminals of the high-side and low-side switching elements of the other pairs other than the predetermined pair in order to prevent a current flowing to the electric rotating machine through the other pairs while the discharge control is performed.

2. The discharge control device for a power conversion system according to claim 1, wherein the discharge control section sets a voltage applied to the conduction control terminal of at least one of the high-side and low-side switching elements of the predetermined pair such that a current in a saturation region of the at least one of the high-side and low-side switching elements when the discharge control is performed is smaller than when the DC/AC conversion circuit operates in a normal state to drive the electric rotating machine.

3. The discharge control device for a power conversion system according to claim 2, wherein, when the DC/AC conversion circuit operates in the normal state, the manipulation signals command one of the high-side and low-side switching elements to be on, and the other to be off for each of the pairs.

4. The discharge control device for a power conversion system according to claim 2, wherein the restraining section turns off the high-side and low-side switching elements of the other pairs when the discharge control is performed.

5. The discharge control device for a power conversion system according to claim 2, wherein the restraining section includes an inhibition section configured to manipulate electrical states of signal paths to transmit the manipulation signals to the conduction control terminals of the high-side and low-side switching elements of the other pairs, such that a voltage to turn on the high-side and low-side switching elements is inhibited from being applied to the conduction control terminals of the high-side and low-side switching elements of the other pairs.

6. The discharge control device for a power conversion system according to claim 2, wherein the discharge control section includes first drive circuits to apply turn-on voltages respectively to the conduction control terminals of the high-side and low-side switching elements of the predetermined pair when the DC/AC conversion circuits operates in the normal state, and second drive circuits to apply turn-on voltages respectively to the conduction control terminals of the high-side and low-side switching elements of the predetermined pair when the discharge control is performed,
   the restraining section interrupts application of the turn-on voltages to the induction control terminals by the first drive circuits when the discharge control is performed.

7. The discharge control device for a power conversion system according to claim 2, wherein the DC/AC conversion circuits operates to mediate power transmission between the electric rotating machine and the DC power source in the normal state.

8. The discharge control device for a power conversion system according to claim 1, wherein the discharge control section sets a voltage applied to the conduction control terminal of one of the high-side and low-side switching elements of the predetermined pair such that a current in a saturation region of the one of the high-side and low-side switching elements of the predetermined pair when the discharge control is performed is smaller than when the DC/AC conversion circuit operates in a normal state to drive the electric rotating machine, and the restraining section turns off one of the high-side and low-side switching elements of the other pairs corresponding to the one of the high-side and low-side switching elements of the predetermined pair when the discharge control is performed.

* * * * *